United States Patent [19]
Gilbert

[11] 3,879,508
[45] Apr. 22, 1975

[54] PROCESS FOR PRODUCING A CORRUGATED FOAMED THERMOPLASTIC RESIN SHEET

[75] Inventor: John Harold Gilbert, Chepstow, England

[73] Assignee: Monsanto Chemicals Limited, London, S.W.1., England

[22] Filed: Apr. 26, 1973

[21] Appl. No.: 354,572

Related U.S. Application Data

[62] Division of Ser. No. 60,971, July 2, 1970, abandoned, which is a division of Ser. No. 663,761, Aug. 28, 1967, Pat. No. 3,571,852.

[52] U.S. Cl. .................... 264/53; 264/54; 264/167; 264/286; 425/325
[51] Int. Cl. .................. B29d 27/00; B29f 3/012
[58] Field of Search ........ 264/51, 53, 54, 321, 286, 264/167; 425/324, 325, 385; 18/12 R, 12 DR, 14 RR, 11

[56] References Cited
UNITED STATES PATENTS

| 790,918 | 5/1905 | Du Pont | 425/325 |
| T912,003 | 7/1973 | Marchant et al. | 264/321 X |
| 2,582,294 | 1/1952 | Stober | 18/12 R UX |
| 2,593,469 | 4/1952 | Mason | 18/12 DR UX |
| 2,905,972 | 9/1959 | Aykanian et al. | 264/321 X |
| 3,051,608 | 8/1962 | Gordon | 425/385 X |
| 3,184,793 | 5/1965 | Plourde | 18/14 RR UX |
| 3,317,363 | 5/1967 | Weber | 264/321 X |
| 3,329,998 | 7/1967 | Stohr | 425/325 X |
| 3,348,264 | 10/1967 | Rice et al. | 425/385 X |
| 3,374,300 | 3/1968 | Azuma | 264/286 X |
| 3,378,432 | 4/1968 | Spencer | 264/321 X |
| 3,392,080 | 7/1968 | Mercer | 264/321 X |
| 3,555,601 | 1/1971 | Price | 264/177 X |
| 3,635,631 | 1/1972 | Fields | 425/324 |

FOREIGN PATENTS OR APPLICATIONS

| 39-6380 | 5/1964 | Japan | 425/325 |
| 641,989 | 8/1950 | United Kingdom | 425/325 |
| 805,494 | 4/1936 | France | 264/321 |

Primary Examiner—Philip E. Anderson
Attorney, Agent, or Firm—Joseph S. Nelson; Edward P. Grattan; James C. Logomasini

[57] ABSTRACT

This application describes corrugated foam thermoplastic materials in which each corrugation is itself corrugated. In effect, the thermoplastic materials are corrugated in two directions and generally have a waffle-like appearance. Also described is a process for producing the double corrugated materials and suitable apparatus therefor. The corrugated materials find many uses, for instance, as a carpet underlay.

7 Claims, 5 Drawing Figures

3,879,508

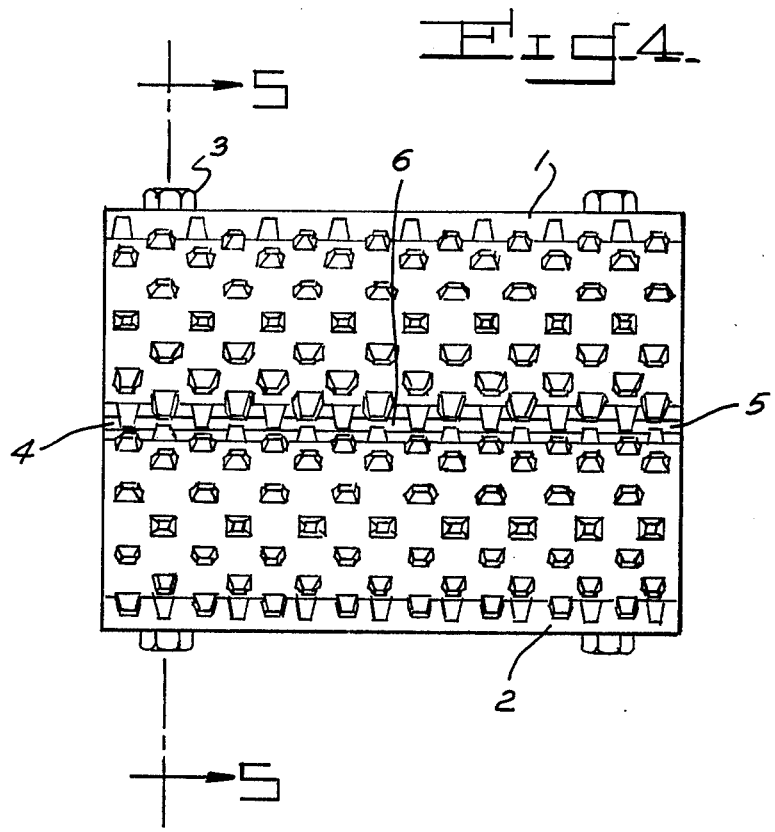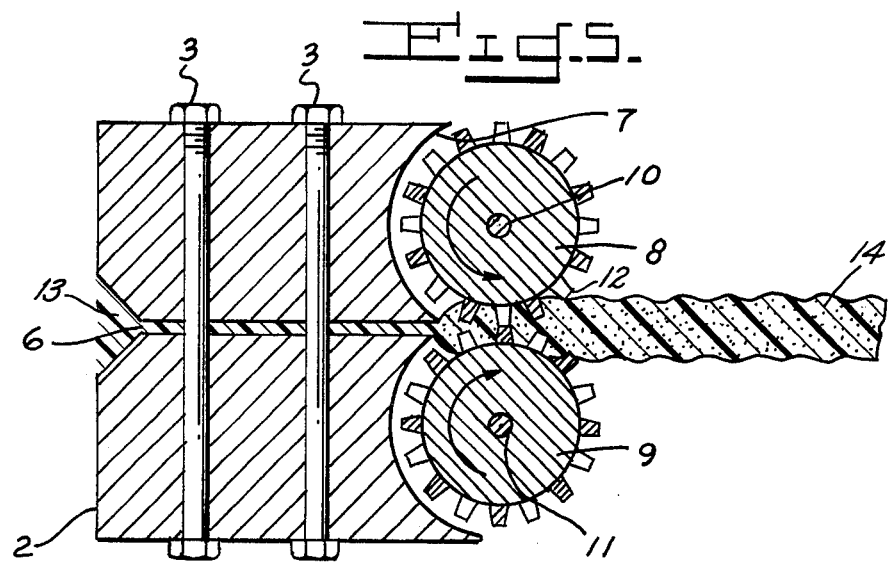

PROCESS FOR PRODUCING A CORRUGATED FOAMED THERMOPLASTIC RESIN SHEET

CROSS REFERENCES TO RELATED APPLICATIONS

This is a division of application Ser. No. 60,971, filed July 2, 1970 now abandoned, which is a division of application Ser. No. 663,761 filed Aug. 28, 1967 now issued as Pat. No. 3,571,852 on Mar. 23, 1971.

BACKGROUND OF THE INVENTION

This invention relates to producing foamed resin products, and particularly to a new extruded foamed resin product as well as to a process for its production. The invention also includes a new apparatus for extruding the new foamed resin product.

Copending application Ser. No. 565,567 filed July 15, 1966 now abandoned, and its continuation-in-part copending application, Ser. No. 87,913, filed Oct. 28, 1969 now abandoned describe an extruded corrugated foamed aliphatic thermoplastic resin sheet in which the corrugations extend parallel to the direction of extrusion and are of approximately equal size and substantially evenly spaced from one another. The corrugated sheet is useful for instance as a carpet underlay.

SUMMARY

This invention is directed to producing corrugated foamed resin products in which each corrugation is itself corrugated.

Accordingly, typical objects of this invention are to produce (1) foamed thermoplastic materials having corrugations running in two directions, (2) a process for forming foamed thermoplastic materials and corrugating same in two directions, and (3) a process utilizing apparatus for forming foamed thermoplastic materials and corrugating same in two directions.

Other objects, aspects and advantages of this invention will become apparent to those skilled in the art upon further study of this disclosure, the drawings and appended claims.

The process aspect of the present invention is one for producing an extruded foamed thermoplastic resin sheet, which comprises extruding a foamable thermoplastic resin composition through a slit die orifice and treating the extruding resin so as to initiate corrugation and the formation of a wave pattern in each corrugation of the extruding foamed resin sheet, the resulting corrugations extending parallel to the direction of extrusion and the resulting wave patterns extending along the length of the corrugations so that each corrugation is itself corrugated.

Normally initiation of the corrugation and of the wave pattern take place simultaneously or within a very short time (for instance less than 0.2 second) of each other. It is important to note that the process is not one of embossing a sheet; rather is initiation used to direct the sideways and longitudinal expansion of the extruding and foaming resin so that the required corrugations and wave patterns are formed. In this way a much greater ratio of depth ($d$) to width ($w$) and of amplitude ($a$) to wavelength ($l$) can be obtained than would be possible by an embossing method.

In another aspect, the invention is directed to a method of forming a foamed resin product that comprises extruding a foamed thermoplastic resin sheet having corrugations that extend parallel to the direction of extrusion, the corrugations having a wave pattern along their length so that they are themselves corrugated, the depth of the corrugations being at least half their width and the amplitude of the wave pattern being at least half the wavelength.

In still another aspect, the invention includes the use of an extrusion die adapted for producing a foamed resin product by a process according to the invention, comprising a slit die extrusion orifice equipped at its outlet end with means for initiating corrugation and the formation of a wave pattern in each corrugation of an extruding foamed resin sheet, the resulting corrugations extending parallel to the direction of extrusion and the resulting wave patterns extending along the length of the corrugations so that each corrugation is itself corrugated.

Preferably the corrugations are of approximately equal size and are substantially evenly spaced from one another. In a preferred form of sheet the depth and width of each corrugation are at least twice the thickness of the foamed sheet of which the corrugations are composed. Preferably also the wave pattern in each corrugation has a wavelength and amplitude that approximately correspond to the width and depth respectively of the corrugations.

Preferably, corrugation and wave-pattern-formation are initiated by means of a pair of rollers having appropriately distributed co-operating projections and recesses, the foaming resin being extruded into the nip between the rollers. However, other means can readily be employed such as for example a pair of comb-shaped members placed near the die face with their teeth intermeshing and extending across the slit, the combs being reciprocated across the slit so as to initiate corrugations and wave patterns. Two pairs of combs, one in front of the other and with the teeth of one pair coinciding with the gaps between the teeth of the other pair, can be employed and reciprocated out of phase with each other so as to produce a more complicated wave pattern.

The resin is preferably a polymer or copolymer of a vinyl or vinylidene monomer, preferably a hydrocarbon monomer such as for example ethylene, propylene, butadiene, styrene, vinyltoluene, or a-methylstyrene, or a substituted monomer such as for example acrylonitrile, vinyl or vinylidene chloride, vinyl acetate, methyl acrylate, methyl methacrylate or ethyl acrylate. Toughened polystyrene can also be employed. Preferably the resin is one, such as for instance polyethylene, that is flexible at room temperature. The resin can be a thermoplastic material that at room temperature has the characteristics of a rubber but which yet behaves as a resin at the elevated temperatures employed in extrusion. The term "thermoplastic resin" accordingly includes a material of this kind, examples of which are the graft styrenebutadiene copolymers sold by Shell Chemicals Limited under the trademark "Cariflex TR" and a copolymer of 55 parts by weight of ethylene and 45 parts by weight of vinyl acetate. Very often the resin is aliphatic, that is to say it is derived by polymerisation or copolymerisation of an aliphatic monomer; excellent results have been obtained using polyethylene, and this is in fact the preferred resin. A copolymer of about 85-90 parts by weight of ethylene with 15-10 parts by weight of vinylacetate is also useful, and polystyrene gives good results where a more rigid product is desired.

Often the product is flexible, particularly when it is a polyolefin such as for example polyethylene or an olefine copolymer such as for example ethylene-vinyl acetate. The degree of flexibility depends to some extent also on the thickness ($t$) of the product, which can for example by up to 0.5 inch or as little as 0.01 inch. Preferably, however, the thickness is from 0.05 to 0.25 inch, particularly about 0.1 inch. The depth and width of the individual corrugations and the wave length and amplitude of the wave patterns are each preferably at least twice the product thickness, and for example it is usually satisfactory if they are each from 2 to 10 times, and preferably from 3 to 5 times the thickness. Often the depth is approximately equal to the width and the wavelength is approximately equal to the amplitude, but these are not essential conditions; for example the depth can be from one-half to 3, and particularly from 1 to 2 times the width. The wavelength can for example be from one-half to 3 times the corrugation width. The corrugations and the wave patterns need not correspond to a pure sine wave; they can have flattened or enhanced peaks and can be asymmetrical with respect to the median plane of the sheet. Moreover, the size of either the corrugations or the wave patterns can vary over the sheet, either transversely or longitudinally: in the latter case the variation will normally be cyclic. The corrugations can extend partly or preferably completely across the width of the sheet.

The foamed resin preferably has a predominantly closed cell structure (that is to say, the majority of the cells in the foam are closed); and cells can for example have a diameter of from 0.001 to 0.5 inch. Preferably the average cell diameter is fairly small, for instance from 0.002 inch to 0.005 inch. The density of the foam can be chosen from within wide limits; for example it can be from 0.5 pound per cubic foot or even less to 30 pounds per cubic foot or more. Preferably however the density is at the lower end of this range, densities of from 1 to 5 pounds per cubic foot, for example about 2 or 3 pounds per cubic foot, being often very suitable.

The resin used in the process is of course foamable, and this means that it is in admixture with a blowing agent which is in general a low boiling substance or a chemical blowing agent. In many instances the agent is a volatile substance, and is one that is a gas or vapour under normal atmospheric conditions (such as 20°C. and 1 atmosphere pressure), but which while under pressure before extrusion is present in solution in the molten or semi-molten thermoplastic resin. The blowing agent can however be one, such as pentane or a pentane fraction, which is a liquid under normal conditions. Examples of volatile substances that can be used include lower aliphatic hydrocarbons such as methane, ethane, ethylene, propane, a butane, a butylene, or a pentane; lower alkyl halides such as methyl chloride, trichloromethane or 1,2-dichlorotetrafluoroethane; acetone, and inorganic gases such as carbon dioxide or nitrogen. The lower aliphatic hydrocarbons, especially butane, are preferred. The blowing agent can also be a chemical blowing agent, which can for example be a bicarbonate such as for example sodium bicarbonate or ammonium bicarbonate, or an organic nitrogen compound that yields nitrogen on heating, such as for example dinitrosopentamethylenediamine or barium azodicarboxylate. From 3 to 30% especially 7 to 20% by weight based on the weight of the resin is often a suitable proportion of blowing agent, and for example the use of from 10 to 15% by weight of butane in conjunction with polyethylene has given excellent results. The blowing agent can be mixed with the resin in several ways; for example particles of the resin can be dusted with the blowing agent where this is a solid, or steeped in it if it is a liquid, before being fed to the extruder. A preferred method where the blowing agent is a volatile substance and the extruder used is of the screw type is to inject the blowing agent under pressure into the extruder barrel.

Preferably the resin also contains a nucleating agent, which assists in the formation of a large number of fine cells. A wide range of nucleating agents can be employed, including finely divided inert solids such as for example silica, talc or alumina, perhaps in conjunction with zinc stearate, or small quantities of a substance that decomposes at the extrusion temperature to give a gas can be used. An example of the latter class of nucleating agents is sodium bicarbonate, used if desired in conjunction with a weak acid such as for example tartaric or citric acid. Boric acid is also an effective nucleating agent. A small proportion of the nucleating agent, for example up to 5% by weight of the resin, is usually effective.

The extrusion temperature (that is the temperature of the die and the resin within it) depends to some extent on the softening point and rheological properties of the resin, but in general temperatures between 90°C. and 180°C., preferably between 95°C. and 160°C. are suitable. For example, when foamable polyethylene is being extruded a temperature in the range of 95°C. to 110°C. is often very suitable.

Extrusion pressures for example greater than 250 pounds per square inch, and especially between 250 and 5,000 pounds per square inch, can be employed. Preferably the pressure is between 300 and 2,000 pounds per square inch.

The extruded product is preferably supported in some way until it has cooled, for example by means of a roller or a moving-belt take-off device or by passing it over a flat plate or between two plates.

The foamed resin product is an excellent lightweight, flexible packaging material. For example, where it is of appropriate dimensions it can be used as a packaging tray for articles such as eggs, fruit, confectionery or small electronic parts that can be nested between the corrugations. Polystyrene is often useful for this purpose. In general the foamed product can also be used in upholstery or as a carpet underlay. It is a thermal insulator; for instance it can be employed in roof insulation, or a sheet can be wrapped around a water pipe or tank so as to form as insulating jacket.

DESCRIPTION OF THE DRAWING

This invention will now be described in more detail with reference to the drawing.

FIG. 4 is a frontal view of the die according to this invention; and

FIG. 5 is a cross-sectional view of the die taken along the line V—V of FIG. 4.

Referring now to FIGS. 1, 2 and 3, the sheet shown has a thickness $t$ and is evenly corrugated as shown in FIG. 2. The corrugations extend parallel to the direction of extrusion as indicated by the arrow in FIG. 1. The individual corrugations have a depth $d$ and a width $w$. As shown in FIG. 3, each corrugation has along its length a wave pattern of wavelength $l$ and amplitude $a$. In the sheet shown, $w$ is approximately equal to $l$ and $d$ is approximately equal to $a$. In many instances, the sheet presents the appearance of a "waffle" pattern.

Referring now to FIGS. 4 and 5, the die comprises two mild steel blocks 1 and 2 held together by bolts 3 each block having a pair of shoulders 4 and 5 one at each end of the block so that with the blocks held together as shown there is defined a slit die orifice 6. The blocks have means (not shown) for mounting them on the front of an extruder so that a foamable resin composition can be extruded through the slit in the direction of the arrow in FIG. 5. The front of each block is ground to a concave cylindrical surface 7, and in front of the blocks are mounted a pair of horizontal rollers 8 and 9 which can be driven in opposite senses about their respective axes 10 and 11 by means of an electric motor and appropriate reduction gearing (not shown). The surfaces of the rollers are studded with a series of projecting teeth 12 arranged in a staggered pattern as shown. The teeth intermesh so that when a foamable resin composition 13 is extruded from the slit it passes into the nip between the rollers, the teeth of which initiate both corrugation and wave formation in the extruding foamed sheet 14.

Figure 1:
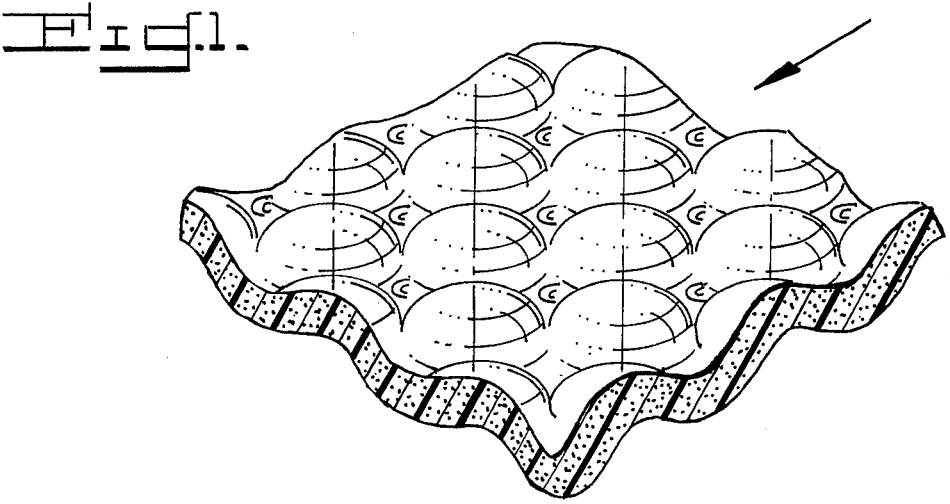
FIG. 1 is a perspective view of the corrugated foamed sheet of this invention.

The dimensions of the die described above can be chosen from within wide limits depending on those desired in the extruded product. The length of the slit die orifice can be for instance from 0.5 inch to 60 inches or more. Often this dimension is between 1 inch and 24 inches. The width of the die orifice (that is to say the distance between its opposite faces) is not usually greater than 0.2 inch; very often a width between 0.005 and 0.1 inch, for example from 0.01 inch to 0.05 inch, will be found suitable. The other dimensions of the die orifice is it land, which is measured in the direction of extrusion, and this can for example be from 0.1 inch up to 2 inches.

The dimensions of the rollers depend on those of the die orifice, for their length is normally at least as great as that of the slit and is preferably slightly greater so that sideways expansion of the extruding foamed resin can be accommodated. The diameter of the rollers (including the height of the teeth) is preferably from about 0.25 inch to 4 inches, for example from 0.5 inch to 2 inches and very often about 1 inch. The member, size and positioning of the teeth depends to some extent on the dimensions of the corrugations and wave patterns that it is desired should be initiated in the product; thus deeper corrugations and wave patterns of larger amplitude are in general initiated by a small number of large teeth than by a large number of smaller ones. Preferably the teeth have cross-sectional dimensions that are of a similar order to the height, for example they can have a cross-section at their bases consisting of a square the length of whose sides is from half to 1.2 times the height. Alternatively, the teeth can have a circular, triangular or any other suitable cross-section.

In one example of a die that has been found particularly useful, the slit 6 has a land of 0.4 inch, a length (measured transversely to the extrusion direction) of 6 inches and width (that is the distance between the faces of the blocks 1 and 2) of 0.025 inch. The rollers have a diameter, measured to the tips of the teeth, of 1 inch, the teeth being 0.15 inch high with a square cross-section tapering from a side of 0.1 inch at their bases to a side of 0.07 inch at their tips, and being spaced 0.265 inch apart with their centres on a series of eight helices each helix being inclined to the roller axis at an angle of 45°.

DESCRIPTION OF PREFERRED EMBODIMENTS

This Example describes a corrugated foamed polyethylene sheet according to the invention and its production by a process according to the invention.

The die used was similar to that described above and illustrated in FIGS. 4 and 5 of the accompanying Drawings, the slit die orifice 6 being 0.025 inch wide and 6 inches long and having a land of 0.4 inch. The rollers had a diameter, measured to the tips of the teeth of 1 inch, the teeth being 0.15 inch high with a square cross-section tapering from a side of 0.1 inch at their bases to a side of 0.07 inch at their tips, and being spaced 0.265 inch apart with their centres on a series of eight helices each helix being inclined to the roller axis at an angle of 45°C.

Pellets of a polyethylene produced by a high-pressure polymerisation process were tumbled with 5% of their weight of finely divided silica to act as nucleating agent, and the pellets were then fed to a screw extruder fitted with the die and having a barrel diameter of 1 ½ inch while injecting butane into the barrel under pressure at a rate corresponding to 12% by weight of the resulting foamable polyethylene composition. The die temperature was 95°C. and the pressure immediately behind the die was 250 pounds per square inch. The extruded product was supported after it left the rollers by passing it between two flat plates that converged slightly along the direction of extrusion.

Figure 2:
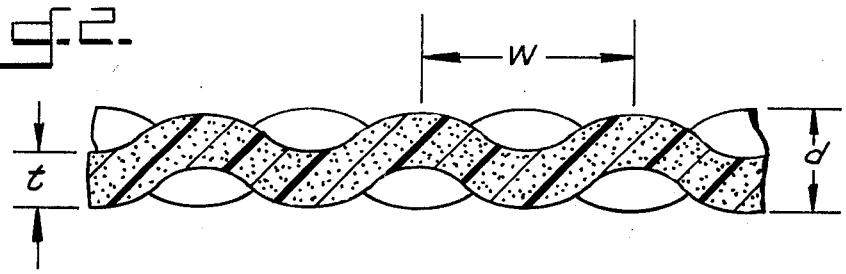
FIG. 2 is a section of the sheet shown in FIG. 1, taken along a line extending across the extrusion direction.
Figure 3:
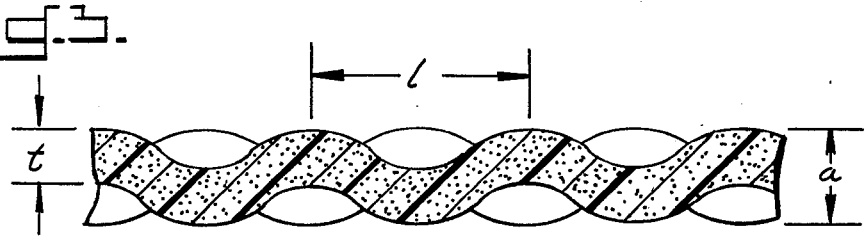
FIG. 3 is a section of the sheet shown in FIGS. 1 and 2, taken along a line extending parallel to the extrusion direction.

There resulted a corrugated sheet of foamed polyethylene similar to that described above and illustrated in FIGS. 1 to 3 of the accompanying Drawings. The thickness of the sheet from which the corrugations were composed was about 0.05 inch and the individual corrugations were of approximately equal size and substantially evenly spaced from one another, having a depth of 0.25 inch and a width 0.3 inch. Each corrugation had a longitudinal wave pattern of amplitude 0.25 inch and wavelength 0.3 inch. The sheet had a density of 2 pounds per cubic foot and contained substantially closed cells of average diameter 0.02 inch. It was flexible and resilient, and could be used as a packaging, cushioning, carpet underlay or thermal-insulating material.

What I claim is:

1. In a process for processing a corrugated foamed thermoplastic resin sheet, which includes extruding a foamable thermoplastic resin composition through a die having a slit die orifice to form a foaming resin sheet, the improvement which comprises:
    1 feeding said foaming resin sheet into a nip of a pair of driven rollers, said rollers being an integral part of said die and being studded with a series of projecting, intermeshing teeth arranged in a staggered pattern,
    2. permitting transverse and longitudinal expansion of said foaming resin sheet within the nip of said pair of rollers, whereby a foamed resin sheet nip of having corrugations and a wave pattern in each corrugation of the extruding foamed resin sheet is formed, the resulting corrugations extending parallel to the direction of extrusion and the resulting wave patterns along the length of the corrugations so that each corrugation is itself corrugated, and 3. supporting said foamed corrugated resin sheet along the direction of extrusion until cool.

2. The process of claim 1, wherein the formation of the corrugations of the wave patterns take place simultaneously or within less than 0.2 second of each other.

3. The process of claim 1 wherein the corrugations are about equal in size and substantially evenly spaced, the depth and width of each corrugation being about 2 to 10 times the thickness dimension of said foamed sheet, the wave pattern in each corrugation has a wavelength and amplitude that substantially corresponds in dimensions to the width and depth respectively of the corrugations, and the temperature of the die and the foaming resin within it being from about 90°C. to 180°C.

4. The process of claim 1 wherein the resin of the foamable thermoplastic resin composition is a polymer of ethylene.

5. The process of claim 1 wherein the resin of the foamable thermoplastic resin is polystyrene.

6. The process of claim 1 wherein the foamable resin composition contains a volatile substance as blowing agent.

7. The process of claim 1 wherein the foamable resin composition contains a nucleating agent.

* * * * *